INVENTOR
DONALD R. RHODES

BY Hurwitz & Rose
ATTORNEYS

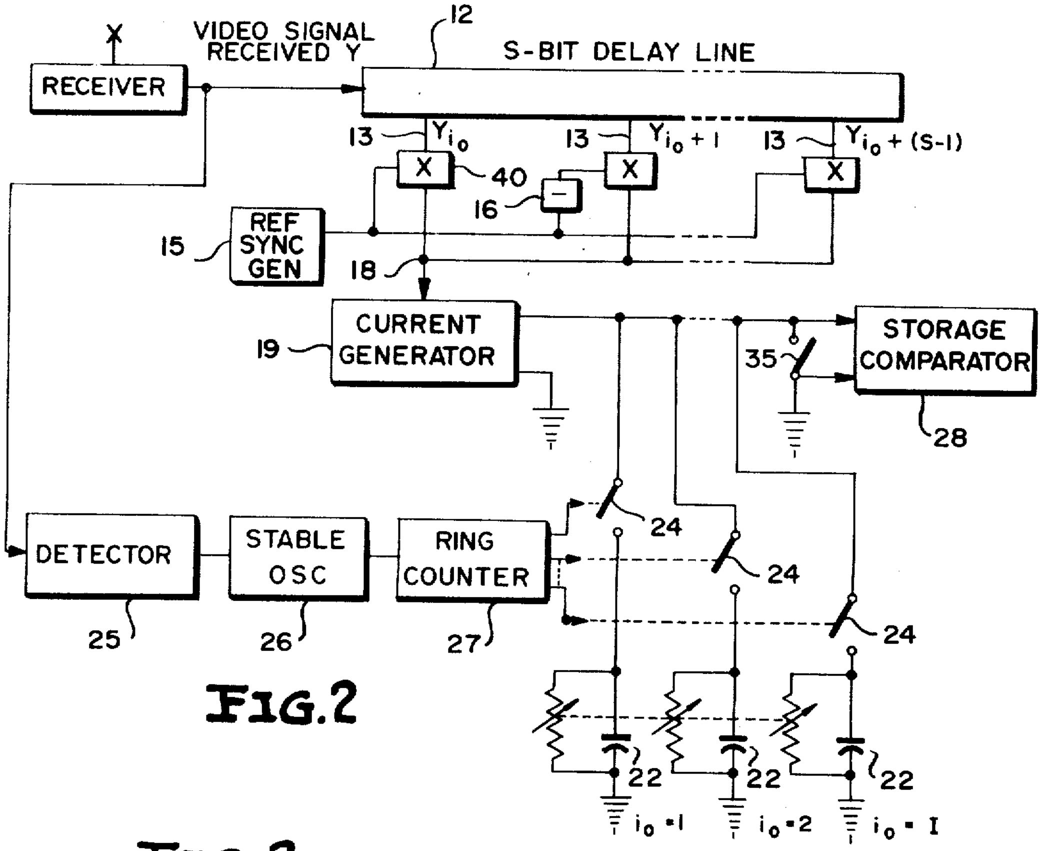
FIG. 2
FIG. 3
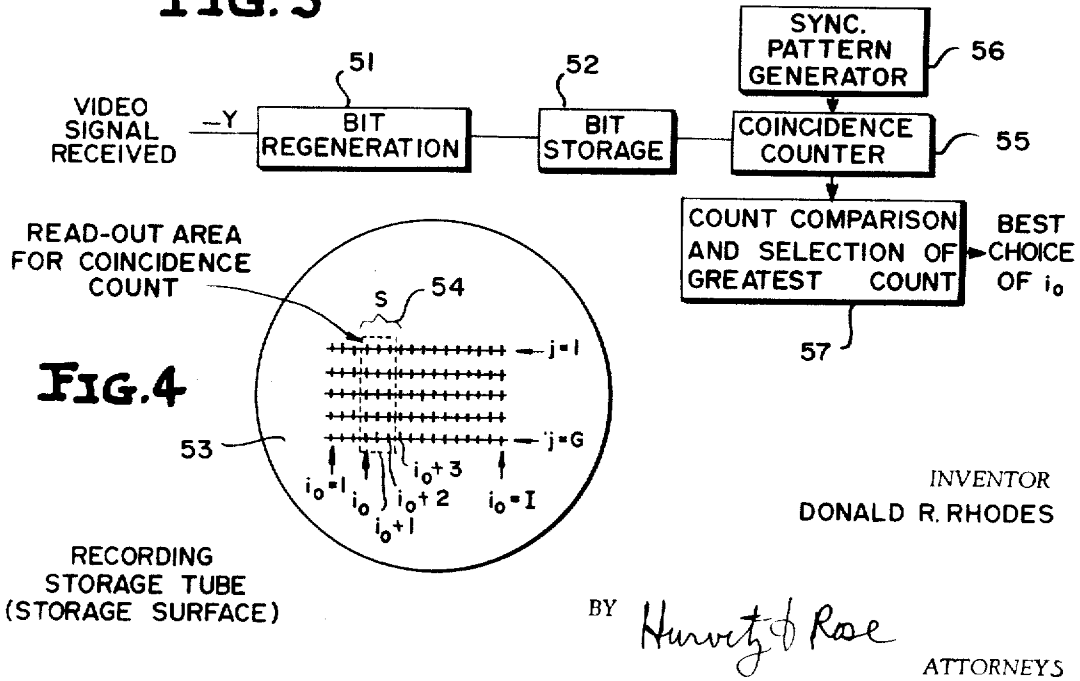
FIG. 4
INVENTOR
DONALD R. RHODES
BY Hurvitz & Rose
ATTORNEYS 3,363,235

PULSE COMMUNICATION SYNCHRONIZATION PROCESS

Donald R. Rhodes, Winter Park, Fla., assignor to Radiation Incorporated, Melbourne, Fla., a corporation of Florida Filed June 7, 1965, Ser. No. 461,816
12 Claims. (Cl. 340—172.5)

The present invention relates generally to systems for communication of intelligence via time division transmission formats and, more particularly to a system or systems for locating the position of synchronizing pulses in such a transmission format.

In a variety of modern communication systems, such as telemetry systems and other types of data transmission systems wherein information is transmitted from one or more sources to one or more remote observation points, it is desirable to provide arrangements and means for increasing system capacity and reducing wasteful multiplication of facilities by combining the several distinct channels on the basis of time or frequency allotment. Such arrangements obviate the need for provision of a separate channel between each source and observation point. To accomplish this objective it is conventional practice to employ a multiplexing arrangement whereby a number of independent or distinct channels of information may be concurrently transmitted through a single channel by separating within the single channel the information or intelligence derived from each of the several channels on a time division basis. The information (alternately termed intelligence or data) is generally transmitted therefore, in the form of a set of time division waveforms, wherein are employed various techniques of pulse modulation, such as: pulse code modulation (PCM) wherein the value of the parameter to be conveyed is converted to a binary number which is encoded as a sequence of binary pulses occurring within the appropriate time segment; pulse amplitude modulation (PAM) wherein the intelligence or information to be conveyed modulates the amplitude of the pulse; pulse duration modulation (PDM) wherein the intelligence to be conveyed modulates the length of the pulse; pulse position modulation (PPM) wherein the intelligence to be conveyed modulates the time position of the pulse relative to a reference time; pulse interval modulation (PIM) wherein the intelligence to be conveyed modulates the time interval between pulses; pulse frequency modulation (PFM) wherein the intelligence to be conveyed modulates the frequency of the pulse; and so forth.

All communication systems using time division waveforms, irrespective of particular type of pulse modulation, require that synchronization signals be provided within the transmission format such that the separation of transmitted data according to distinct channel relationships and the necessary derivation of original data may be accomplished at the receiving point in a reliable manner. To this end, one or more synchronizing pulses are included in each transmission format or pulse sequence, the number of such synchronizing pulses present in each sequence being preselected by a compromise between such factors as the desired reliability of the system, the cost of the system, the stability of the system, and the capacity of the system. The latter factor is a recognition that synchronizing pulses occupy valuable space in the transmission channel which might otherwise be used for conveying additional intelligence; nevertheless, it is obviously essential that some synchronization pulses be included in the transmission format to permit the derivation of information at the receiving point as well as the continued observation and supervision of the timing operation of the receiving system to insure that the ultimately derived information is a reliable representation of that which was transmitted from the source or sources thereof.

An additional problem is that of resolving the ambiguity which arises from the fact that the synchronizing pulses are not readily distinguishable from the intelligence-bearing pulses of the transmission format. Hence, unless some method is provided for locating the actual or most likely position of the synchronizing pulse patterns it is not possible to derive data in a reliable manner from the transmission format. It is this problem, that is, the location of position of the pattern of synchronizing pulses in a transmission format, with which the present invention is concerned, and, as will be noted upon a consideration of the ensuing description, the solution of which is a primary object of the present invention.

It is to be emphasized that any discussion of particular time division waveforms in connection with the detailed description of embodiments of the present invention is purely by way of illustration, and that the invention may be embodied in a variety of forms to render it applicable to any time division waveform. The exemplary embodiments are set forth in compliance with pertinent provisions of the patent statute and are not to be taken as placing any limitations on the scope of the present invention, which will be defined solely by the appended claims.

Consider, as one example of a transmission format containing a fixed synchronization pulse pattern and a sequence of intelligence-bearing or information-containing pulses having one or more parameters which vary in some random fashion, a serial PCM non-return-to-zero (NRZ) waveform, having groups of 30 bits, each group forming a code word. Assume that contained within these 30 bits are four synchronizing bits, for example the first four bits of the code word, which establish the sync pattern, and that the remaining bits carry the desired information. It will readily be seen that the receiving system will be enabled to derive the information contained in such a transmission format only if the position of the synchronizing pulse pattern (bit pattern in this example) has first been ascertained. It will of course, be understood that in any time division transmission format one or more of the pulses in each pulse group of the format will constitute synchronizing pulses, and that the pattern of synchronizing pulses may occur anywhere in the format, or may be external thereto in the form of a special separate format. The present invention is capable of handling any of these variations.

As an example of the operation of a prior art system in determining the position of the sync pattern, there is examined some predetermined number of channels (or pulses) and a definite decision is made as the data or information examined shifts by one channel (or pulse). In PCM, for example, such a system clocks the regenerated waveforms through a shift register and counts the number of coincidences between the regenerated waveform and the synchronization (sync) pattern. A sync decision is then made in the first position for which the coincidence count exceeds some predetermined number, designated as the threshold. Since the information-bearing pulses vary in a random fashion it is unlikely that they will occur in a sequence that would produce a coincidence count exceeding the threshold number. A new count is made each time a new bit enters the shift register. Such a process is relatively inefficient and time consuming.

In accordance with an embodiment of the present invention, the position of the sync pulse pattern in the time division transmission format is located by the parallel examination of a plurality of pulses equal in number to the number of pulses in the sync pulse pattern. In general, the number of pulses employed to provide a sync pattern will not exceed that number which is necessary and sufficient to establish the desired stability and accuracy of the system. Any larger number would simply waste system capacity. A corresponding number of successive pulses is examined each time the pulse sequence shifts by one pulse. With the successive examinations of shifted (or displaced) pulse sequences, each during a fixed time interval, there are respectively derived representative physical quantities which are each a predetermined function, in the mathematical sense, of the variable parameter of the format (for example, the amplitude of the pulses in a PAM system). Each of these physical quantities is successively stored and compared with the immediately succeeding derived quantity to determine, on a basis depending on the particular mathematical function employed, the maximum likelihood of the position of the sync pattern, or, what is the same thing, of the beginning of the sync pattern.

To this end, there is provided an S-position delay line, where S corresponds to the number of successive pulses to be examined at any one instant of time and will generally be equal to the number of sync pulses in each pulse group of the transmission format under consideration. The delay line comprises a plurality (S) of taps separated each from the other by a delay time equal to the time interval between adjacent pulses in the group. Each of the pulses appearing at the taps is combined, in a manner to be described, with a like-numbered pulse in a reference sync pattern to form a predetermined mathematical function. In this embodiment, the square of the difference of the respective pulses of the pulse sequence and the reference pattern is derived for each pulse under examination and the set derived is summed to form the mean squared difference function for the S-position sequence. Each of these sums is employed to respectively control the level of energy stored by each of a plurality of storage elements equal in number to the number of pulses in each group of the transmission format. The process is repeated in a like manner until a physical quantity representing the mean squared difference function of each parallel-examined S-position pulse sequence is stored by a respective one of the plurality of storage elements. Concurrent with the storage of each quantity it is compared in significant parameter with the quantity stored immediately prior thereto. In this embodiment, the physical quantity is an energy level and the parameter compared is the magnitude. When the set of pulses occupying the S-positions of the delay line is the sync pulse pattern of the pulse group, i.e. is comprised only of synchronization pulses, the mean squared difference function in the absence of noise will be zero. Similarly the energy stored in that instance will be zero, and will thus be readily identifiable by comparison with the levels of energy stored by the other storage elements. In this manner, the best choice, in the sense of maximum likelihood, of position of the sync pulse pattern in the pulse group may readily be ascertained.

The reference sync pattern may not be derivable from the received signal and, in that case, must be known in advance or be determinable from a source or sources independent of the received signal. For example, in PCM/FM the frequency deviation used may be known apriori at the receiver, and similarly with zero amplitude sync pulses for PAM or PDM.

The mean squared difference function is formed for each sequence of pulses occupying the S-positions of the delay line, i.e., over the length of the sync pulse pattern in each group, and over as many groups as may be necessary to establish the desired synchronization. After the mean is formed for each set (S-position pulse sequence) and the quantity derived therefrom is stored in the respective storage element, the position of the sync pulse pattern is ascertained by comparing each of the stored quantities with the others. In a particular embodiment, the quantity derived may conveniently be the voltage level on a capacitor. The position of the sync pulse pattern, in that case, may be determined by ascertaining which of the capacitors has the minimum voltage level. Mathematically, the mean squared difference function or mean squared error stored by each storage element may be expressed as $$\sum_{j=1}^{G} \sum_{i=i_0}^{i_0+(S-1)} (Y_{ij} - \overline{X}_{i-i_0+1})^2 \qquad (1)$$

Where $j$=a group of pulses in the transmission format;
$i$=a pulse in each group;
G=the number of groups under consideration;
S=the number of pulses in the sync pulse pattern;
$i_0$=the first pulse in each group;
$Y_{ij}$=the amplitude of the $i$th pulse of the $j$th group, and
$X_i$=the amplitude of the $i$th pulse of the reference sync pattern.

It will be noted that this is but one of several possible functions which may be formed; the particular function chosen will depend upon the type of pulse modulation employed in the time division waveform, and may be useful for a plurality of types of pulse modulation involving a single parameter. The function identified by Equation 1, above, may be formed in any suitable manner; one convenient circuit will be detailed presently.

It will be understood that a latent ambiguity is present in any attempt to determine position of the sync pulse pattern in any particular group of the transmission format. This is because the information pulses of each group vary in a random fashion, and hence it is possible, though not likely, that a sequence of information pulses equal in number to the number of sync pulses may present the same pattern as the sync pulses. In such a case, however, the synchronization will rapidly be reestablished as succeeding pulses are subsequently applied to the S-position delay line and examined.

In accordance with another embodiment of the present invention, a cross correlation function is formed between S-position pulse sequences of each group and a reference sync sequence. This function is formed or derived over the same limits as described above in connection with the mean square difference function of the previous embodiment. It will be observed that the cross correlation function will provide a maximum level in the storage element representative of the sync pulse pattern position rather than a minimum value, as was obtained in the previous example. Mathematically, the level stored by each storage element is the cross correlation representation $$\sum_{j=1}^{G} \sum_{i=i_0}^{i_0-(S-1)} Y_{ij} \overline{X}_{i-i_0+1} \qquad (2)$$

all of these symbols having previously been defined.

Other than the requirement of the function-forming circuitry, the apparatus of the two embodiments is quite similar. It will be appreciated that because of the finite memory of the storage elements, the deleterious effect of time base slippage is rapidly overcome, that is, the finite memory allows the synchronizer to recover quickly from any loss of sync caused by slippage.

In accordance with still another embodiment of the present invention, a digital form of cross correlation is provided whereby the number of coincidences between an internally generated reference sync pattern and corresponding pulses in groups of the received transmission format is counted and the counts compared with one another. Regeneration of the received pulse sequence into binary zeros and binary ones is performed by slicing at the zero level. The bits thus obtained are sequentially applied to a storage unit, such as the surface of a recording storage tube, in successive groups such that like-positioned bits in the different groups are correspondingly aligned. For example, the bits in successive groups may be aligned in positional correspondence by being written into successive lines on the recording surface of the storage tube. A count is then made of the number of coincidences between each of the aligned S-bit sequences of the regenerated wave form and the reference sync pattern and the counts are successively compared. The largest count provides the best indication, that is, the maximum likelihood, of the starting position of the sync pulse pattern in each group.

It is, accordingly, a further object of the present invention to provide new and improved apparatus for locating the position of the pattern of synchronizing pulses in a serially coded transmission format having a predetermined time base.

It is another object of the present invention to provide apparatus for determining the position of the sync pulse pattern in a time division transmission format by the parallel examination of consecutive pluralities of successive pulses, each plurality of pulses shifted by one pulse at predetermined time intervals, the pulses corresponding in number to the number of sync pulses in each group of the format.

It is still another object of the present invention to provide apparatus for determining group sync pulse positions in a transmission format by comparing functions formed during the respective parallel examination of each of a plurality of pulse sequences in the received format.

It is a further object of the present invention to provide means for determining group sync pulse position within a transmission format by forming mean squared functions from the difference between pulse sequences in each pulse group of the format and a predetermined reference sequence.

An additional object of the present invention is to provide means for ascertaining group sync pulse position in a received transmission format by forming the cross correlation function between successive pulse sequences in the received format and a reference sequence.

Still another object of the present invention is to provide means for locating group sync pulse position in a transmission format, whereby the likelihood of false sync is monotonically decreased by the parallel examination of an ever-increasing number of pulse sequences in the received pulse groups.

It is a further object of the present invention to provide a system for locating the position of a pattern of synchronizing pulses in a serially coded transmission format by successive comparisons of physical quantities each representing a mathematical function of the relationship between respective pulse sequences in the transmission format and a reference sync pulse pattern.

The above and still further objects, features and attendant advantages of the present invention will become apparent from a consideration of the following detailed description of certain illustrative embodiments thereof, especially when taken in conjunction with the accompanying drawings in which:

FIGURE 2 is a circuit diagram of a further embodiment of the present invention wherein a cross correlation function is formed;

FIGURE 3 is a block diagram of still another embodiment of the present invention wherein a digital form of cross correlation function is employed to locate sync pulse pattern; and FIGURE 4 is a front view of the face of the recording storage tube which may be employed as the storage device in the embodiment of FIGURE 3.

Figure 1:
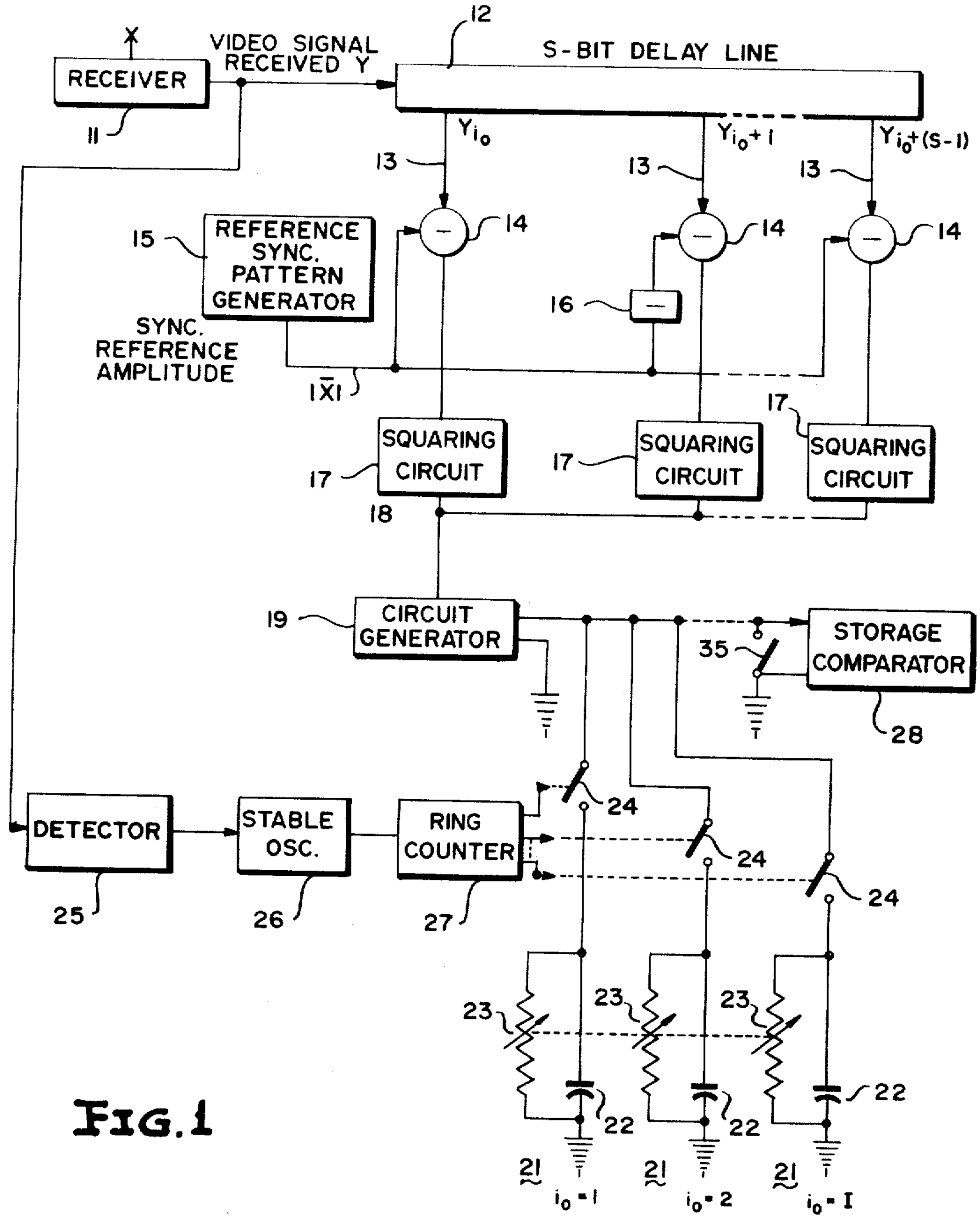
FIGURE 1 is a circuit diagram of one embodiment of the present invention in which group sync pulse position is determined in accordance with the formation of a mean squared difference function for each of successive pulse sequences in the received transmission format relative to a reference sync pattern.

Referring now to FIGURE 1, a receiver 11 provides an output in response to signals received from one or more remote transmitters. The output of receiver 11 contains the transmission format which comprises one or more time division wave forms of the pulse modulated type which may include PCM, PAM, PDM, or other conventional types of pulse modulation. Assume, for example, that the transmission format is PCM and includes a plurality of pulse groups, each of which contains a sequence of I pulses. In this respect, it will be understood that references to pulses may include pulses of zero amplitude, i.e., the absence of pulses. In providing for synchronization within the transmission format, one or more of the pulses of each group constitute a pattern of synchronizing pulses; this pattern may occur anywhere within the group or format or may be external thereto, that is, transmitted as a separate synchronizing pattern, but relatively indistinguishable from information pulses without special examination. In each of the illustrated embodiments to be described, it will be assumed that a sync pulse pattern of S pulses occurs at the beginning of each group, although it is to be understood that the invention is not limited to such a sync pattern position. Furthermore, the sync pulse pattern need not be in a continuous block, but may be scattered throughout the format.

There is, of course, no special significance in the beginning of a pulse group insofar as the time interval between successive pulses is concerned. In the above context, the symbols I and S refer to integers, where S is considerably smaller than I and I minus S (I−S) pulses are the intelligence bearing pulses of the transmission format.

The receiver output, which is a replica of the modulation waveform received, is applied to an S-position delay line 12 having a delay time between the first and last of the S-positions therealong corresponding to the duration between the occurrence of the first and last of any sequence of S pulses in each group.

Delay line 12 is provided with a plurality of taps 13 corresponding in number to the number of sync pulses in a group and separated from each other in time (along the delay line) by the time interval between adjacent pulses in the pulse sequence. Thus, successive pulses constituting a pulse sequence corresponding in number of pulses to the number of sync pulses in the group will appear at the respective taps 13 and may be examined in parallel. Initially, again assuming that the sync pulse pattern occurs at the beginning of the group, the first sync pulse appears at the terminal designated $Y_{i_0+(S-I)}$ and the last sync pulse at the terminal designated $Y_{i_0}$. Similarly, during the next time interval, the sequence will shift by one pulse so that immediately adjacent pulses of the waveform applied to delay line 12 will have advanced and appear in parallel at the respective terminals 13, the process continuing as each successive sequence of S pulses of the group is examined.

The position of the sync pulse pattern in each group of the transmission format is determined in the following manner. The pulses present at each of the terminals 13 at any particular instant of time are applied in parallel to respective ones of subtraction networks 14. Each of subtraction networks 14 is similar to the others and may comprise, for example, a conventional addition network of either the active or passive type which is used for subtraction by inverting the sign of the input to be subtracted by the employment of an inverting amplifier. The other input to each of the respective subtraction networks 14 is obtained from a reference sync pattern known a priori and generated by generator 15 or derived in a conventional manner from the received waveform. Where the reference sync pattern is not derivable from the received signal, it must be known in advance of the received waveform. For example, when a transmission format is communicated via PCM/FM, the frequency deviation employed could be known a priori at the receiver; and similarly with zero amplitude sync pulses for PAM or PDM. In any event, the derived reference sync pulses are applied directly to subtractors 14, or through phase inverters 16 in accordance with the sequence of phase changes in the sync reference pattern.

The outputs of each of the subtraction networks 14 are applied to respective ones of squaring circuits 17. The latter may each comprise any conventional circuit for producing the square of the signal applied at its input. The polarity of the outputs of the subtraction networks 14 is, of course, immaterial, since the squares formed by devices 17 will always be positive. Thus, each of the square law devices 17 generates a positive polarity signal level in accordance with the square of the difference in level between the reference sync pulses and the respective ones of the pulses appearing at delay line terminals 13; mathematically. $(Y_{i_0+k}-\overline{X})^2$, where $Y_{i_0+k}$ is the output of the $k$th tap and $\overline{X}$ is the reference level. In the embodiment of FIGURE 1, it is assumed that a PCM format is under consideration, or some transmission format in which the data is conveyed by modulation of the amplitude of the pulses. Where the synchronization and data information is conveyed in the transmission format as a variation of some other parameter of the time division waveform, appropriate changes will be required in the function-forming circuitry to provide a quantity which is a function of the varied parameter.

The outputs of square law devices 17 are linearly combined to provide at node 18 an electrical quantity, for example a voltage, whose level is a function of the mean square difference of the S-position sequence and the reference pattern during a given time interval. The whole set of sums according to Equation 1, above, for $i_0 \leq i \leq I$, $1 \leq j \leq G$ are required to provide an indication of the position of the sync pulse pattern in the transmission format.

When the sync pulse pattern is positioned in the delay line, that is, when only sync pulses are present at the delay line taps 13, the mean square difference function formed will be zero, assuming no noise or fading. This is a result of the correspondence between the sync pulse pattern and the reference sync pattern. At an interval of time later, equal to the interval between adjacent pulses in the pulse sequence, the last sync pulse will have advanced to tap $Y_{i_0+1}$ and the first information pulse will appear at tap $Y_{i_0}$ and the parameter level at terminal 18 representing the mean square difference function will probably have a positive (non-zero) value. This is a consequence of the likelihood of a difference between the sync pattern itself and the pulse pattern now positioned at the delay line taps. The latter sequence contains a data pulse in addition to sync pulses. For example, if the PCM sync pattern consisted of alternating zeros and ones (which is a poor sync pattern, but useful for purposes of illustration), displacing it by one bit would produce the greatest possible change. Hence, for each pulse position I in a pulse group, that is, each time the pulse sequence positioned in the delay line 12 is displaced by one pulse, the level at terminal 18 will vary as a function thereof; and, except for the time interval during which only sync pulses are positioned in the delay line, the function will likely have a non-zero value.

Each of the sequentially occurring voltage levels at node 18 in turn controls the output current supplied by current generator 19 to respective ones of I storage elements 21, where I is again the total number of pulses in each group. In practice, current generator 19 may be any conventional current source whose output level may be controlled by a bias voltage applied to a control terminal thereof. In the illustrated embodiment each of storage elements 21 includes a normally open switch 24 connected in series with the parallel combination of a capacitor 22 and resistor 23. The sequential currents will therefore operate to charge the respective capacitors 22 to voltage levels which are dependent upon the value of the function at node 18 during the respective interval of time under consideration.

Any appropriate means may be employed to synchronize the application of charging currents to storage elements 21 from current generator 19 with the displacement of the S-position pulse sequence in the delay line by one pulse. In the embodiment of FIGURE 1, exemplary apparatus for such purpose may comprise a detector 25, stable oscillator 26 and ring counter 27. Oscillator 26 is locked to the time base of the transmission format by detector 25, operating on the output of receiver 11. The output signal of oscillator 26, locked to the repetition frequency of the PCM format in this example, is applied to ring counter 27, the latter having I stages, that is, a number of stages equal to the number of pulses in each group. The ring counter is accordingly triggered and outputs are stepped from consecutive stages thereof in non-overlapping time sequence to sequentially close switches 24 to which they are respectively coupled. Switches 24 are thereby closed in synchronism with the generation of sequential currents from current generator 19 in accordance with the time base of the transmission format.

When the aforementioned process has occurred for an arbitrarily prescribed number of pulse groups G of the transmission format, each of switches 24 will have closed G times. In consequence, each of the capacitors 22 will have accumulated a charge proportional to the sum of the mean squared difference voltages derived for its respective pulse locations in the G groups, that is, the $i_0$th capacitor will be charged to a value which is a function of the mean squared difference for the S-position sequence corresponding to the $i_0$th pulse and summed over the several groups under observation.

Resistors 23 are respectively connected across capacitors 22 to provide a selectable finite memory time for the storage elements in the form of a discharge path which sets rate of decay of stored charge.

This memory time may be adjusted in accordance with the time base of the transmission format such that if slippage of one or more channels or pulses in the received waveform should occur, capacitors 22 will not retain faulty sync information for more than a preselected period of time; for example, the total time encompassed by G successive groups of pulses. In practice, the memory time is the same for each storage element. Thus, the synchronizing system is permitted to recover rapidly from any loss of sync caused by slippage or other deleterious effects. In the event of a total signal failure as, for example, might occur from a severe drop in signal-to-noise ratio, each of the storage capacitors 22 may be discharged by the closure of switch 35 accompanied by a sequential closure of switches 24. When the system has been restored, switch 35 may again be opened and the process resumed.

The final stage of the testing process occurs simultaneously with the sequential storage of charge on the respective capacitors 22. To this end, each of the storage elements 21, i.e., the parallel combination of storage capacitors 22 and resistors 23, are connected in parallel with storage comparator 28 so that each time a switch 24 is closed, a voltage proportional to the charge on the particular capacitor associated with that switch is applied to the comparator. Comparator 28 operates to store the voltage across the first capacitor ($i_0=1$) when its associated switch 24 closes, and compares that voltage with the voltage sensed immediately thereafter on the next capacitor, ($i_0=2$) when the latter's associated switch 24 is closed in the switching sequence. The lower of the two voltages is stored and an indication of the storage element 21 from which that lower voltage was obtained is retained by comparator 28; this process is continued until each storage element 21 has been progressively sampled and an indication of that element having the lowest stored charge displaced. Since each element corresponds to a specific S-position pulse sequence, an indication of the storage element having the least voltage thereacross is also an indication of lowest value of mean squared error for such a sequence. This represents in the sense of maximum likelihood, the best indication of beginning position of the sync pulse pattern in the transmission format. It will be noted that each time a switch 24 closes in the sequence there is a concurrence of two events: (1) a new charge is deposited on the respective storage capacitor 22, and (2) the voltage on that capacitor is measured and compared with the lowest voltage previously measured in storage comparator 28.

Referring now to FIGURE 2, there is shown another embodiment of the present invention, but in this case the function formed is a cross-correlation of S-position pulse sequences and the reference sync pulse sequence. Again the transmission format is applied to delay line 12, successive pulses thereof appearing at respective taps 13 in an S-position sequence. The pulses of the sequence (with the understanding that certain of these pulse portions may be absent a pulse) are applied in parallel to multipliers 40. The other input to each of the multipliers is a respective pulse of the reference sync pattern.

Reference sync pattern generator 15 supplies the reference pulses to the plurality of multiplier networks 40 associated with delay line taps 13. The reference sync pulse pattern is thus employed as a multiplicative factor, phase inversion being provided (by appropriate networks 16) in accordance with the requirements set by the sync pattern.

Operation of the embodiment of FIGURE 2 will readily be observed to be quite similar to that of the embodiment of FIGURE 1, the only difference being in the function formed at terminal 18. If there is an exact correspondence between the reference sync pattern and the pattern of pulses appearing at taps 13 of the S-position delay line during any given interval defined by the time base of the transmission format, the signal level at node 18 will have a maximum value. Hence, by a parallel examination of each S-position sequence of pulses, displaced one position at the conclusion of each time interval, there can be determined the most likely position of sync pulse pattern in each pulse group.

As time progresses, and the last sync pulse moves from tap or terminal $Y_{i_0}$ to tap or terminal $Y_{i_0}+1$, the pulse appearing at terminal $Y_{i_0}$ will be an information pulse of the particular group under consideration at that time. Because of the unlikelihood of correspondence of this new S-position pattern with the reference sync pattern, that is, the unlikelihood that one will be a replica of the other, the signal level at summing terminal 18 will, in all likelihood, be less than that which was present thereat when only sync pulses were positioned at taps 13. The level during any particular interval represents the summation $$\sum_{i=i_0}^{i_0+(s-1)} Y_{ij}X_{i-i_0+1}$$

for the S-position pulse sequence during that interval. Operation of the remainder of the circuit is essentially that described with reference to FIGURE 1, except that here it is the maximum voltage appearing on any one of capacitors 22 of storage elements 21 which will represent the best indication (maximum likelihood) of the beginning position of the pulse sync pattern in the transmission format. Again, the capacitor voltage levels are sequentially sensed and compared and the comparative levels indicated, with the maximum level occurring in the sequence of comparisons being retained as the best indication of sync pulse pattern position. Storage comparator 28 may be of any conventional design to accomplish this purpose and will differ from that described in the embodiment of FIGURE 1 only to the extent that a maximum rather than a minimum value is to be sensed.

In the embodiment of FIGURE 2, after G groups have been received and examined, the capacitor 24 of the $i_0$th storage element will have accumulated a charge having a magnitude proportional to the function $$\sum_{j=1}^{G} \sum_{i=i_0}^{i_0+(s-1)} Y_{ij}X_{i-i_0+1}$$

as previously mentioned.

Referring now to FIGURES 3 and 4 of the drawings, still another embodiment of the present invention is illustrated; in this case, the embodiment employing a digital form of cross correlation. It will be described in exemplary form as it relates to a PCM transmission format.

The received video signal is applied to a bit regenerator 51 comprising a slicing circuit operating at zero slicing level. The output waveform of regenerator 51 will therefore include a plurality of binary bits, having zero and one values when the received signal is greater and less than zero level, respectively.

The regenerated bits are applied sequentially to a storage device 52, which may, for example, be a recording storage tube, the face of which is illustrated in FIGURE 4. Storage tube 53 includes, on the storage surface thereof, G lines, that is, a number of lines equal to the number of groups arbitrarily selected for consideration.

Each of the G lines representing a pulse sequence group in the transmission format has associated therewith I storage bit locations corresponding in number to the number of bits in each group. The correspondingly positioned bits in each of the lines (rows) are vertically aligned in respective columns so that when all of the G groups are written (recorded) on the storage surface 53 there will be an S-column representation, among the I columns, in which all of the sync pulses may lie.

In order to determine with maximum likelihood the position of the sync pulse S-column representation, a succession of S-columns are swept for readout in rapid sequence during a one bit interval. Each of the sweeps will therefore cover all G lines in S consecutive vertically aligned bit positions. Thus, for example, in FIGURE 4 with $S=3$, the $i_0$, $i_0+1$ and $i_0+2$ bit positions of the G lines will be swept in rapid sequence during a single bit interval. Following the sweep of that succession of columns, the sweep beam is displaced one bit position to the right or left, depending on the scanning sequence, to scan the bits recorded in the next block of S-columns. The operation is continued by one-column displacements for each S-column sequence on the face of storage tube 53.

Readout in the aforementioned manner produces corresponding pulses (for example, a pulse for each binary one encountered by the sweep) at the output of the storage device, the pulses being conveyed to a coincidence counter 55 in rapid sequence via a conductive path therebetween. In addition, generator 56 applies the reference sync pattern (known in advance) to another input of coincidence counter 55 to effect a comparison between each sequence of readout pulses and the reference sync pattern. The time base of the pulse sequences under comparison may be synchronized in any convenient manner.

As each bit position is read out of storage tube 53, the pulses deriving therefrom are compared with those applied to the counter from generator 56. When a coincidence occurs between these pulses a count is registered and is accumulated in counter 55 for each S-column position.

After each S-column, such as 54, has been scanned, the count accumulated in counter 55 is applied to storage comparator 57, and the counter is restored to zero. With each succeeding count applied to comparator 57 from counter 55 a comparison is made with the previous high count retained by the comparator. If the new count is greater than the previously stored highest count, the former replaces the latter in the comparator storage circuit; otherwise the latter is retained and the former ignored. In addition, an indication of the lowest numbered bit position for the retained count is stored by the comparator so that upon completion of the operation the positional indication retained by comparator 57 is indicative, in the sense of maximizing likelihood, of the beginning position of the sync pulse pattern.

Where bit storage device 52 of FIGURE 3 comprises a recording storage tube (FIGURE 4), the number of groups which may be examined during any given period is limited only by the maximum number of lines which may be written or recorded on the storing surface of the tube.

As previously indicated, this number of groups is arbitrarily selected with a view toward maximizing the likelihood of location of sync pulse pattern positions. The groups or portions thereof, may be erased and replaced as desired in known manner.

While I have described and illustrated certain specific embodiments of my invention it will be apparent that the various details of construction and operation set forth herein may be modified without departing from the true spirit and scope of the invention. It is therefore desired that the present invention be limited only by the appended claims.

I claim:

1. Apparatus for resolving at a receiving station of a communication system the location of a synchronization pulse pattern in a time division transmission format, said transmission format comprising a sequence of pulses having a parameter which is modulated in accordance with the information conveyed via said system, said format including G pulse groups each having I possible pulse positions and further including at least one sequence of S synchronization pulses, where G, I and S are integers, $S<I$, said apparatus comprising means responsive to said format for deriving separate and successive sequences of S pulses in parallel therefrom, each successive sequence of S parallel pulses being displaced by one pulse in said format at the conclusion of each interval corresponding to the time base of said format, means for combining separate ones of said sequences of S parallel pulses with a reference sequence of S synchronization pulses during respective ones of said time intervals to form from each a signal representative of a value of a predetermined function of the modulated parameter of the pulses in said transmission format, means for sequentially comparing the signal values obtained from said means for combining against the signal value last observed in the sequence of comparisons which is closest to a predetermined value, and means for determining the location of the sequence of S pulses in said format which formed, in combination with said reference sequence of S synchronization pulses, said closest value, that location being maximum likelihood of the position of said synchronization pulse pattern in said format.

2. The combination according to claim 1 wherein said means for deriving separate and successive sequences of S pulses in parallel comprises a delay line having S taps, each tap separated from the immediately adjacent tap by a time interval equal to the time base of said format.

3. The combination according to claim 2 wherein said means for combining to form said signals includes means for sequentially generating levels of electrical energy, said levels being proportional respectively to said values of said function; and wherein said means for determining said location includes a plurality of electrical energy storage elements each corresponding respectively to a unique position of each S pulse sequence in a pulse group, said plurality of storage elements being sequentially responsive to the levels of energy generated by said means for generating so that each element stores a different one of said levels of energy.

4. The combination according to claim 3 wherein said means for combining further includes means for deriving sequential signals each indicative of the mean squared error between the modulated parameter of a respective sequence of S parallel pulses and of said reference of synchronization pulses, said mean squared error being said predetermined function, said signals each representing a value of said function and sequentially controlling said means for generating for the successive generation of levels of energy proportional thereto.

5. The combination according to claim 3 wherein said means for combining further includes means for deriving signals each indicative of a cross-correlation between the modulated parameter of a respective sequence of S parallel pulses and of said reference sequence of synchronization pulses, said cross-correlation being said predetermined function, said signals each representing a value of said function and sequentially controlling said means for generating for the successive generation of levels of energy proportional thereto.

6. The combination according to claim 3 further including means for synchronizing the response of said means for sequentially comparing and of said plurality of storage elements to the sequential generation of said levels of electrical energy in accordance with the time base of said transmission format; and wherein said means for sequentially comparing further includes means for storing only the energy level which, as indicated by said comparisons, is closest to said predetermined value; and wherein said means for determining said location further includes means for retaining an indication of the location of that sequence of S pulses from which said energy level stored by said means for storing was derived.

7. In a pulse communications system, apparatus for determining the location of group synchronization pulses in the pulse sequence format transmitted via said system, said format including G pulse groups, each pulse group having I possible pulse positions including S synchronization pulse positions, where G, I and S are integers, said apparatus comprising means responsive to each successive sequence of S pulses in said format and to a reference sequence of S synchronization pulses for deriving therefrom respective signals representative of a predetermined relationship between each S-pulse sequence in said G groups and said reference sequence, each of said signals being derived during a separate time interval corresponding to the time base of said format, means for comparing the signals derived for every pulse position in said format, and means responsive to a sequence of said comparisons for designating the location, in the sense of maximum likelihood, of said group synchronization pulses in said format.

8. The combination according to claim 7 wherein said system comprises a pulse code modulation system, and wherein said means for deriving includes means for generating bits in response to received pulses, means for sequentially storing the generated bits, means for sequentially scanning S-bit sequences of the stored bits in a preselected scanning pattern and for producing sampling pulses representative of the bits scanned, and means simultaneously responsive to said sampling pulses and to said reference sequence of synchronization pulses for accumulating a coincidence count therebetween and for producing further signals representative respectively of each count; and wherein said means for comparing includes means responsive to said further signals for collation thereof; and wherein said means for designating includes means responsive to the collation of said further signals for storing during each said time interval only that one of said further signals being collated which has the maximum value, the further signal finally retained by said last named means for storing being, in the sense of maximum likelihood, derived from said group synchronization pulses and designative of the location thereof in said format.

9. The combination according to claim 7 wherein said system transmits information in a pulse modulation format, and wherein said means for deriving includes a multi-tapped delay line for the parallel examination of a sequence of pulses in said format during each of said time intervals, said sequence of pulses being displaced by one pulse position at the conclusion of each time interval, and function-forming means responsive to the pulses appearing at the taps of said delay line during each time interval and to said reference synchronization pulse sequence for producing said respective signals representative of a predetermined relationship therebetween, said predetermined relationship being a function of the modulated parameter of the pulse modulation format transmitted via said system.

10. The combination according to claim 9 wherein said function-forming means includes means for combining said pulses appearing at said delay line taps during each time interval with said reference synchronization pulses to produce error signals representative of the difference between respective ones thereof, means for squaring each of said error signals produced during each time interval, and means for summing each of the squared error signals during each time interval, to form a means squared difference function of said modulated parameter for each pulse position in said format.

11. The combination according to claim 9 wherein said function-forming means includes means for combining said pulses appearing at said delay line taps during each time interval with said reference synchronization pulses to produce coincidence signals representative of the product of respective ones thereof, and means for summing said coincidence signals during each interval, to form a cross-correlation function of said modulated parameter for each pulse position in said format.

12. Apparatus for determining group synchronization pulse position in a transmission format having I possible pulse positions, comprising means responsive to successive sequences of a predetermined number of pulses in said format for deriving a signal representative of each respective sequence and indicative of the position thereof in said format, means for combining each of the derived signals with a reference signal, means responsive to the combined signals for comparison thereof for each of the I possible pulse positions in said format, and means for establishing the position of group synchronization pulses in response to a sequence of comparisons of said combined signals.

References Cited

UNITED STATES PATENTS 3,058,104 10/1962 Garfinkel et al. ------ 343—6.5

PAUL J. HENON, *Primary Examiner.*

I. S. KAVRUKOV, *Assistant Examiner.*